United States Patent [19]

Fatehi et al.

[11] Patent Number: 5,229,876
[45] Date of Patent: Jul. 20, 1993

[54] TELEMETRY FOR OPTICAL FIBER AMPLIFIER REPEATER

[75] Inventors: M. T. Fatehi, Middletown; Nils A. Olsson, Gillette, both of N.J.

[73] Assignee: AT&T Bell Laboratories, Murray Hill, N.J.

[21] Appl. No.: 499,112

[22] Filed: Mar. 26, 1990

[51] Int. Cl.$^5$ .......................... H04B 10/00; H01S 3/00
[52] U.S. Cl. ...................................... 359/160; 359/173; 359/179; 359/341; 372/6; 340/870.28; 385/31
[58] Field of Search .................... 370/3; 455/606, 607, 455/608, 612; 359/154, 160, 174, 176, 341, 113-114, 181, 173, 179, 127; 372/6; 340/870.28; 385/31

[56] References Cited

U.S. PATENT DOCUMENTS

| | | | |
|---|---|---|---|
| 4,616,898 | 10/1986 | Hicks | 370/1 |
| 4,723,824 | 2/1988 | Shaw et al. | 372/6 |
| 4,778,238 | 10/1988 | Hicks | 370/1 |
| 4,906,092 | 3/1990 | O'Meara | 455/611 |
| 4,918,396 | 4/1990 | Halemane | 455/613 |
| 4,959,837 | 9/1990 | Février et al. | 372/6 |
| 5,017,885 | 5/1991 | Saleh | 455/611 |
| 5,035,481 | 7/1991 | Mollenauer | 455/610 |
| 5,058,974 | 10/1991 | Mollenauer | 372/6 |

FOREIGN PATENT DOCUMENTS

| | | | |
|---|---|---|---|
| 0051636 | 3/1983 | Japan | 359/160 |
| 2077909 | 12/1981 | United Kingdom | 359/174 |

Primary Examiner—Edward L. Coles, Sr.
Assistant Examiner—Kinfe-Michael Negash
Attorney, Agent, or Firm—E. Weiss

[57] ABSTRACT

In this invention telemetry information is transmitted in an optical fiber communication system by providing an amplifier pump with excess power beyond that necessary to pump the amplifier. The excess power is not used to pump the amplifier but is rather used to transmit the telemetry information. In a specific embodiment, an optical communication system including a doped optical fiber amplifier such as, for example, an erbium doped amplifier, is provided with an amplifier pump which operates at approximately 1.48 μm. The amplifier pump is provided with excess power so as to transmit telemetry information. In a specific embodiment, the telemetry signal can be detected with a low cost photodetector at a subsequent station.

10 Claims, 5 Drawing Sheets

TELEMETRY FOR OPTICAL FIBER AMPLIFIER REPEATER

TECHNICAL FIELD

This invention relates generally to optical amplifiers and, more particularly to a erbium—or other area earth element—doped fiber amplifier having on-line telemetry and in-service performance and/or parameter monitoring.

BACKGROUND OF THE INVENTION

Present day commercial lightwave systems use optical fibers to carry large amounts of multiplexed digital data over long distances from a transmit terminal to a receive terminal. The maximum distance that the data can be transmitted in the fiber without amplification or regeneration is limited by the loss and dispersion associated with the optical fiber. In general, dispersion is reduced by using single mode fibers which have minimum dispersion at the operating wavelength and by using frequency low chirp transmitters.

To transmit optical signals over long distances, the lightwave systems in use today include a number of regenerators or repeaters periodically located along the fiber route from the transmit terminal to the receive terminal. Each repeater boosts the weak received signal to compensate for the transmission losses which occurred from the last repeater.

The repeaters currently used in long haul lightwave systems are not fully optical. They detect light photoelectrically, amplifying the resulting current electronically and then use the retimed (regenerated) current to drive a semiconductor laser which converts the electrical signal back into an optical signal. The optical signal is then carried in the optical fiber to the next repeater in the system where the conversion from optical to electrical and back again to optical is repeated again.

In an all-optical transmission system the optical signal, once generated, will be transmitted optically, amplified optically and received for detection at the destination. There will be no intermediate conversion of the signal being transmitted from optical-to-electrical and then back to optical. The use of an optical amplifier to provide direct optical amplification of an optical signal will result in the elimination of the electronic processing procedure and will enable optical communication systems to have repeaters which have higher bandwidths are physically smaller, simpler in design, more efficient to operate and more economical to produce.

One area which can present a problem is that of monitoring the in-service performance and the operating parameters of the optical fiber amplifier when used as a repeater. This is necessary because, as an example, the gain of optical amplifiers can be affected by both environmental effects (i.e. variations of ambient temperature) and changes in system variable (i.e., changes in source wavelength and the polarization of the input signal). Another area of concern when using an optical fiber amplifier as a repeater in an optical communication system is that of being able to send telemetry command signals to the repeater and having the repeater detect the telemetry command signals. Still another area of concern is the need to permit maintenance personnel located at one optical fiber amplifier repeater to communicate with other maintenance personnel located at another optical fiber amplifier repeater.

Thus, in long haul optical fiber transmission systems which include optical fiber amplifier repeaters, a need exists for on-line telemetry to permit the monitoring of system health information, supervisory signals, remote control commands and fault locate data between the terminals and the repeaters. In achieving this, it is imperative that the telemetry channel does not interfere with the traffic on the system.

SUMMARY OF THE INVENTION

In this invention telemetry information is transmitted in an optical fiber communication system by providing an amplifier pump with excess power beyond that necessary to pump the amplifier. The excess power is not used to pump the amplifier but is rather used to transmit the telemetry information. In a specific embodiment, an optical communication system including a doped optical fiber amplifier such as, for example, an erbium doped amplifier, is provided with an amplifier pump which operates at approximately 1.48 μm. The amplifier pump is provided with excess power so as to transmit telemetry information. In a specific embodiment, the telemetry signal can be detected with a low cost photodetector at a subsequent station.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

Figure 1:
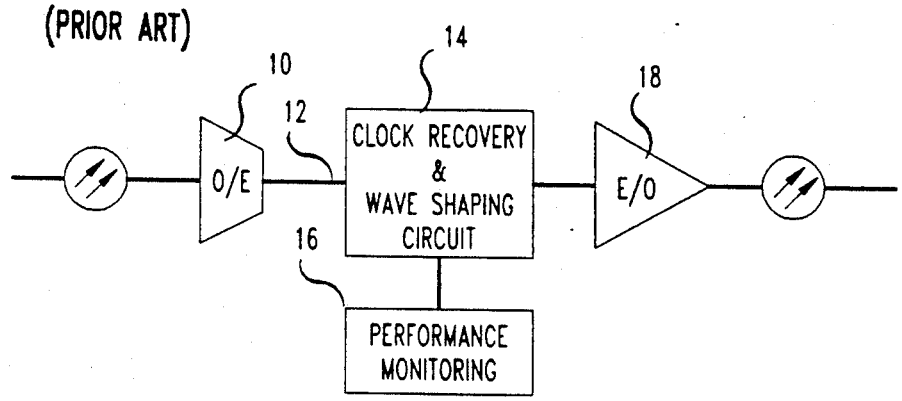
FIG. 1 is a block diagram of a typical prior art regenerative repeater.

Referring to FIG. 1, there is illustrated a typical prior art regenerative repeater for use with an optical fiber system. The repeater can comprise an optical-to-electrical convertor or receiver 10 coupled to receive optical signals from an optical fiber 12 and convert said signals into electrical form. The electrical signals from the optical receiver are transmitted to a clock recovery and waveshaping circuit 14 which electrically regenerates the received signal. A performance monitoring network 16 is coupled to monitor the performance of the repeater. The regenerated signal from the circuit 14 is directed to an electrical-to-optical transmitter (typically a laser diode) 18 where it is converted back to optical form and launched onto optical fiber to either a next occurring repeater or a receive terminal. Briefly, the repeater rebuilds the receive signal to permit continued transmission of the optical signal along the optical path.

Figure 2:
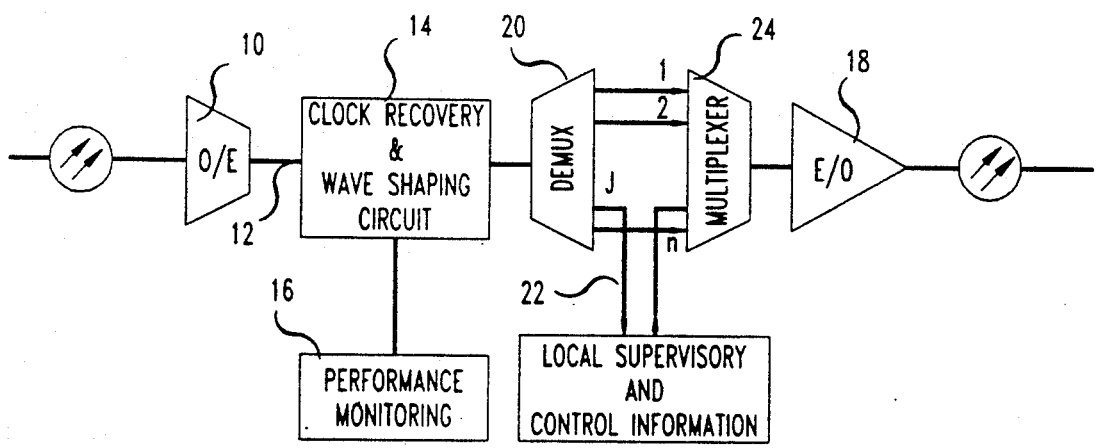
FIG. 2 is a block diagram of the repeater of FIG. 1 including circuitry for on-line telemetry access.

The repeater of FIG. 1 becomes more elaborate when telemetry capability is added. Referring to FIG. 2, there is illustrated a block diagram of the structure of FIG. 1 including telemetry circuitry. Components of FIGS. 1 and 2 which are similar have similar reference numerals. The structure of FIG. 2 includes, in addition to the structure of FIG. 1, a circuit 20 for demultiplexing the signals received to permit one of the transmitted channels 22 to be used for telemetry information. Local supervisory information and control commands are received and/or transmitted via this channel which is then combined with all of the other channels by multiplexer 24. The electrical output signal of the multiplexer 24 is converted by the electrical-to-optical transmitter 18 for continued transmission via the optical fiber to the next occurring regenerator.

Since there are usually several fiber lines in each route, there are several repeaters in each repeater station—one for each line. It is to be noted that the telemetry information being transmitted is on only one of the repeater lines and all of the other lines can be reserved exclusively for data. Obviously, the restriction of telemetry information to only one line helps in keeping the costs of the regenerators to a minimum. By limiting the telemetry information to a single line, only one of the many lines being transmitted must be equipped with telemetry access and each of the other lines can be regenerated with the more economical structure of FIG. 1 which does not require a demultiplexer-multiplexer section.

Telemetry information is usually required because most repeater stations are located in remote areas and are unmanned. For system maintenance purposes it is necessary to have telemetry access to all repeater locations to provide:

1) Access to the performance monitoring parameters of the repeater;
2) Send and receive remote control signals to and from the various regenerators;
3) Send and receive fault locate parameters to help isolate the location of a fault which develops in the system to a specific maintenance section, i.e., that portion of the system which lies between two consecutive repeaters;
4) Order wires or Order channels (voice or data communication channels) for craft personnel dispatched to remotely positioned repeaters to communicate with each other while trouble shooting or servicing the system.

As noted above, long haul optical communication system are still using repeaters of the type illustrated in FIGS. 1 and 2 and, therefore, the systems are not fully optical from end to end. Typically, the optical signals must be transformed into electrical signals for amplification, and the like, and then transformed back to an optical signal for further transmission. The use of optical amplifiers in optical communication systems permit direct amplification of optical signals without requiring the conversion of optical signals to electrical signals and then back again to optical form for further transmission. Thus, to improve long haul communication systems, the currently used repeaters such as those illustrated in FIGS. 1 and 2 will be replaced with optical fiber amplifiers.

Figure 3:
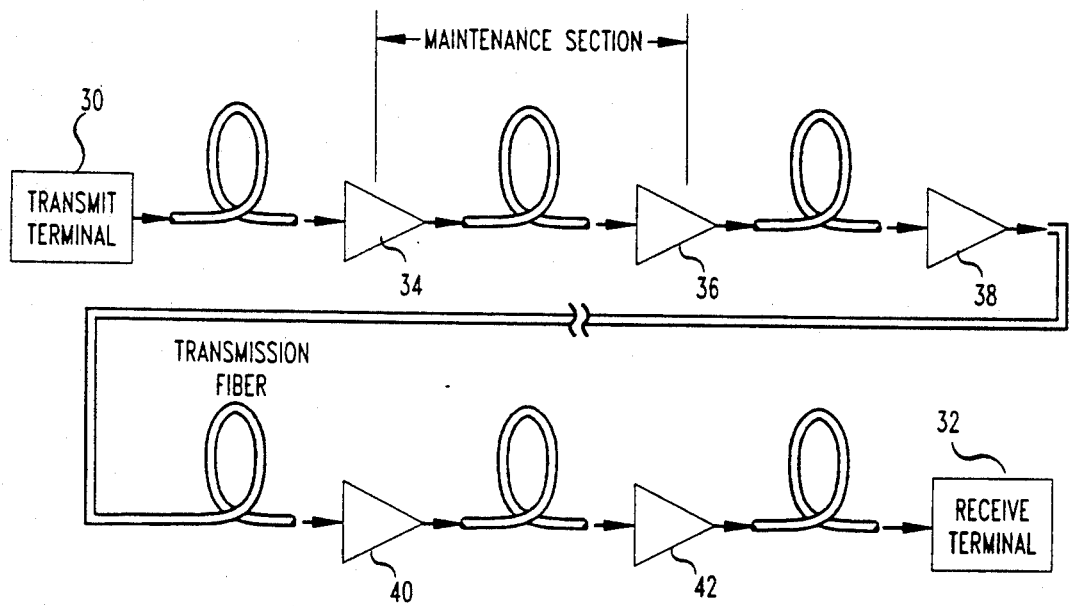
FIG. 3 is a block diagram of a lightwave communication system having optical amplifiers as repeaters.

Referring to FIG. 3, there is disclosed a lightwave communication system which utilizes optical fiber amplifiers as repeaters. The system includes a transmit terminal 30, a receive terminal 32, and a plurality of optical fiber amplifiers 34,36,38,40,42 interposed between said transmit and receive terminals where said optical fiber amplifiers operate as repeaters. The circles shown in FIG. 3 represent optical transmission fibers. In this embodiment the signal being transmitted from the transmit terminal 30 to the receive terminal 32 is in optical form. There is no intermediate conversion to electrical form.

The optical amplifier illustratively disclosed in FIG. 3 can be a rare earth doped optical amplifier where the doping material can be, for example, erbium. Doped optical fiber amplifier has low noise properties, has a relatively broad gain which is not polarization dependent, has negligible pulse distortion and has relatively low coupling losses to the transmission fiber. In operation, a rare earth doped fiber optical amplifier which can have a length of, for example, 10 to 50 meters is coupled end-to-end to an optical communication fiber and is normally traversely coupled, through a directional coupler to a laser diode pump so that a weak optical input signal at some wavelength within the rare earth doped optical fiber amplifier experiences a gain. The directional coupler is designed to have a high coupling ratio at the pump wavelength and a low coupling ratio at the signal wavelength. The pump light may be made to propagate either co-directionally or contra-directionally with respect to the signal, or it may be pumped simultaneously from both ends. The rare earth doped fiber optical amplifier can be coupled to the optical fiber transmission fiber via a core-to-core splice.

Figure 4:
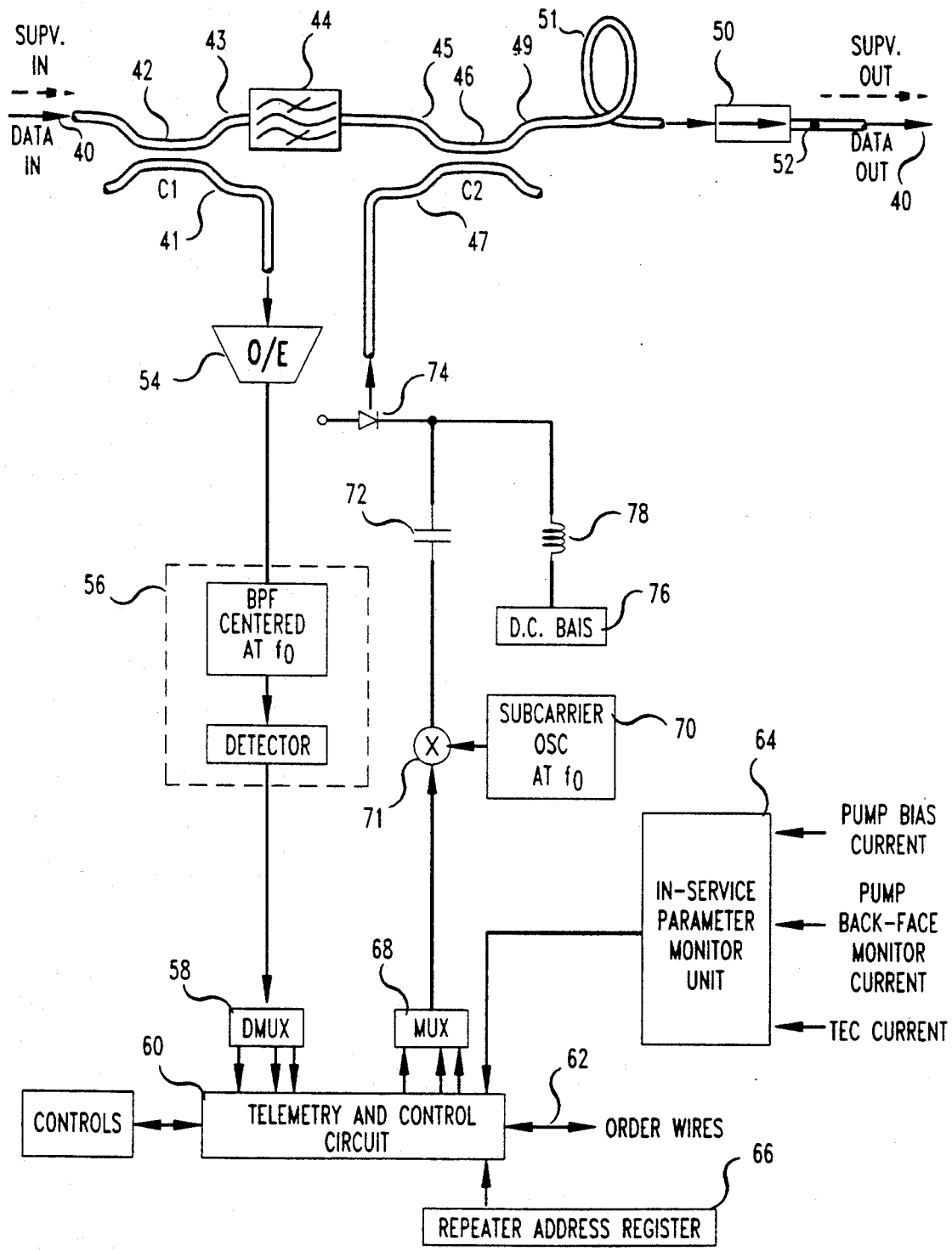
FIG. 4 is a diagram of a doped fiber optical amplifier repeater with a co-propagating telemetry system in accordance with the principles of the invention.

Referring to FIG. 4, there is illustrated a doped fiber optical amplifier having on—line telemetry and in—service performance and/or parameter monitoring in accordance with the principles of the invention. An optical fiber 40 for carrying optical data is connected to an input port of a wavelength selective splitter or fiber coupler 42 having one or two input ports and two output ports. One output port 43 of coupler 42 is coupled through a filter and isolator 44 which is desirable but not required, to an input port 45 of a second coupler or wavelength selective combiner 46 having two inputs ports 45,47 and one or two output ports. Output port 49 of coupler 46 is coupled to an optical fiber amplifier 51 dopes with a rare earth such as erbium, the second output port, if it exists, is not used except, possibly, for performance monitoring purposes. The other end of the optical fiber amplifier is coupled through an isolator 50 and an output port 52 to an optical fiber transmission path.

Returning to coupler 42, output port 41 is coupled through an optical-to-electrical converter 54 to a low-cost broadcast-type AM or FM receiver 56 which can simply comprise a Band Pass Filter BPF centered at the chosen carrier frequency $f_0$ and a detector. The output of the detector is coupled to a demultiplexer 58, which separates the various channels, and the output signals of the demultiplexer are coupled to a telemetry and a control circuit 60.

Also coupled to the telemetry and control circuit are local telephone lines 62, in In-service parameter monitor unit 64; a repeater address register 66; various control signals and a multiplexer 68. The signals from multiplexer 68 are fed to an AM or FM modulator 71 where the signals from the multiplexer 68 modulate a carrier signal at the designated frequency $f_0$ from a subcarrier oscillator 70 operating at $f_0$. The modulated signal from modulator is directed through a dc blocking capacitor 72 to the laser pump 74 of the erbium-doped optical amplifier 51. Thus, the signals from multiplexer 68 modulate the signal form the subcarrier which, in turn, modulates the signal from the pump 74. A bias potential from a source of dc voltage 76 is coupled through an ac blocking coil 78 to the laser pump 74. Capacitor 72 prevents the dc bias potential from reaching modulator 71; and coil 78 prevents the signal from the multiplexer and the subcarrier oscillator 70 from affecting the pump 74 bias potential.

The in-service parameter monitor unit 64 is coupled to receive signals representative of various operating parameters such as pump bias current, pump back-face monitor current, TEC current, embedded identification tones and the like.

In operation, for an erbium-doped fiber amplifier (EDFA), a data signal having a center wavelength of, for example, 1.55 μm is carried by fiber 40 to coupler 42 which passes the data signal to port 43 of coupler 42. The data signal is then passed by filter and isolator 44 and the coupler 46 and is fed to the erbium doped optical fiber amplifier 51. The energy from laser pump 74, which has a wavelength of substantially, for example, 1.48 μm, is coupled into the optical fiber amplifier via coupler 46. In addition to the dc signal supplied to the pump 74 from the source of dc bias 76, an ac telemetry signal is supplied to the pump from modulator 71. It has been determined that an ac signal of a frequency between several KHz and 400 MHz can vary the intensity of the signal from the pump 74 without adversely effecting the operation of the laser pump 74 or the operation and gain of the erbium doped fiber amplifier. If the modulating signal to the pump is less than 2 KHz, the output of the pump is affected within, in turn, affects the output power of the optical amplifier. In this invention by modulating a 2 KHz signal with a telemetry signal, the amplitude of the data will vary with the telemetry signal. Thus, with modulating signals of less than 2 KHz, gain modulation of the data signal from the optical amplifier can occur. In this invention, a subcarrier modulated signal which, in turn, modulates the signal of the laser pump, can be used to transmit telemetry information along an optical fiber.

The energy from the laser pump is in excess of the power requirements of the erbium doped optical amplifier and, therefor, at the output port 52 of the erbium doped fiber optical amplifier, there are two optical signals. One signal is that of the 1.55 μm data signal and the other is that of the 1.48 μm pump signal which carries the telemetry information. The pump signal with the telemetry information and the data signal are carried by the optical fiber to the next occurring repeater where they are separated by a coupler, for example, coupler 42. Thus, by modulating the pump signal with on-line telemetry this information can be transmitted via the optical fiber to another repeater located either upstream or downstream.

In FIG. 4, the modulated pump signal travels along the optical fiber to the next occurring repeater located at the right. Thus, the telemetry and control circuit 60 collects all of the performance or parameter monitoring information in addition to other desired information such as order wires for telephone communication and the like and assembles this information into a bundle of data which is digitally multiplexed together in any desirable multiplexing manner and used to modulate the signal from the subcarrier oscillator at modulator 71. The modulated signal is fed, together with the dc bias signal from the bias source 76 to the laser pump 74 of the erbium doped optical amplifier. The frequency of the subcarrier can vary from 2 KHz to 400 MHz. In one embodiment the frequency of the subcarrier was set at 20 MHz and this signal was modulated with 1.5 megabits of information. The modulation of the subcarrier is not limited to any particular format and can be, for example, either Frequency Shift Keying, Amplitude Shift Keying, AM, FM or the like.

As noted above, the modulated signal is fed to and causes the amplitude or power of the 1.48 μm signal from the laser pump 74 to fluctuate. The fluctuating 1.48 μm signal from the laser pump together with the amplified 1.55 μm data signal from the erbium doped optical amplifier passes through the isolator 50, travels along the optical fiber 40 and arrives at the next repeater. For purposes of explanation, it can be assumed that the next repeater is the left hand portion of FIG. 4. Thus, the 1.55 μm data signal and the 1.48 μm telemetry signal are received from optical fiber 40 at an input port of coupler 42. Coupler 42 separates the two signals, the 1.55 μm data signal being directed through the optical filter and isolator 44, and coupler 46 and arrives at the erbium doped optical amplifier where it is amplified. The telemetry signal at the coupler 42 is directed via port 41 toward optical-to-electrical converter 54 where the received optical signal is converted into electrical form. The telemetry signal from the optical-to-electrical converter 54 is directed to demodulator 56 and the output signal from the demodulator 56 is directed toward demultiplexer 58 which separates the signals on the various information signals from each other. The output signals from the demultiplexer are directed to the telemetry and control circuit for utilization as desired.

In this invention, it can be said that the telemetry signals resides on top of the data signals but at the pump wavelength; and as noted above, this is accomplished by modulating the laser pump signal of the erbium doped optical fiber amplifier.

Figure 5:
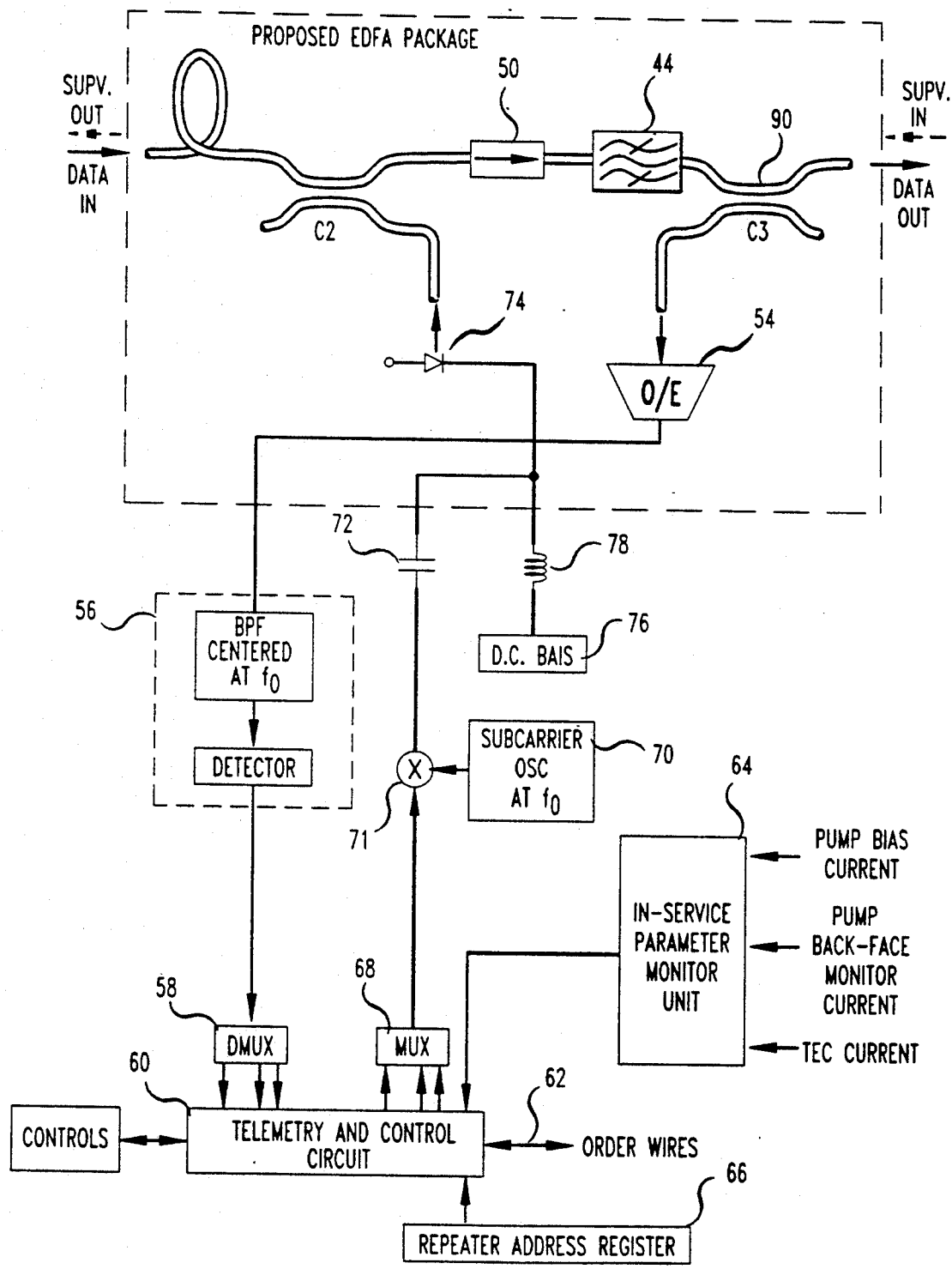
FIG. 5 is a diagram of a doped fiber optical amplifier repeater with a counter propagating telemetry system in accordance with the principles of the invention.
Figure 6:
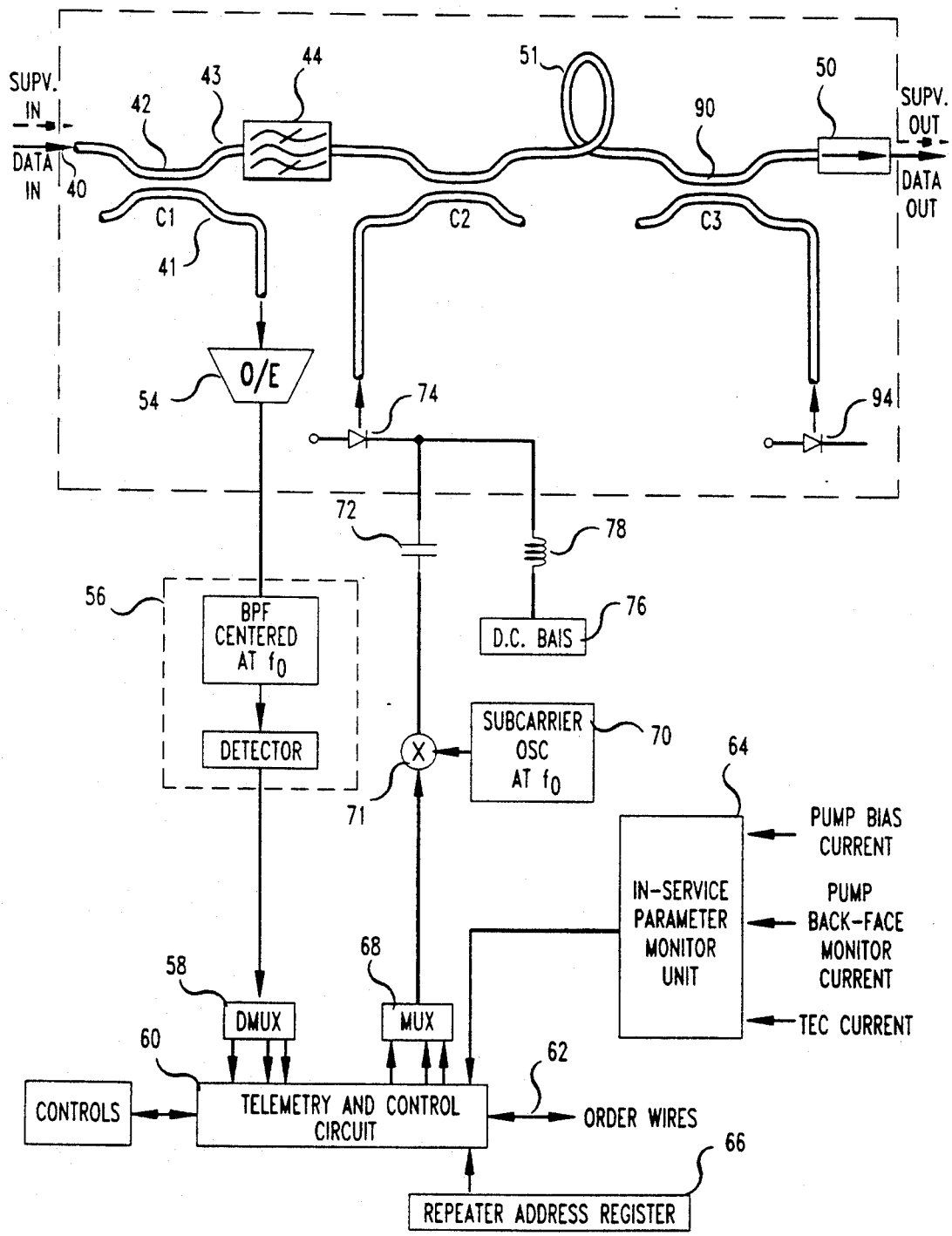
FIG. 6 is a diagram of a doped fiber optical amplifier repeater having a dual pump system and a telemetry system in accordance with the principles of the invention.

Referring to FIG. 4, the energy from the laser pump is introduced downstream of the erbium doped fiber amplifier and can be referred to as being a co-propagating telemetry system. If desired, however, the laser pump can be connected to introduce pump energy upstream of the erbium doped fiber amplifier and this can be referred to as being a counter propagating telemetry system. A typical counter propagating telemetry system is illustrated in FIG. 5. Further, if desired, a laser pump can be connected at each end of the erbium doped optical fiber amplifier to provide a dual pump system. This embodiment is illustrated in FIG. 6. In FIGS. 4, 5 and 6, the primary difference is the location of the laser pump, the filter and isolator which is optical, and the addition of a coupler. The other parts of the various FIGS. are similar in operation and layout. Therefore, to avoid undue repetition, the description of the various components of FIGS. 5 and 6 which are common with the components of FIG. 4 appear in the description of FIG. 4 and are not again repeated herein. In each FIGS. 4, 5 and 6, the telemetry information is disclosed as traveling in a single direction. The optical transmission path which carries data in the other direction is used to also carry telemetry information in the reverse direction.

We claim:

1. A telemetry system for an optical fiber transmission system comprising
   a rare earth doped optical fiber amplifier for optically amplifying a received data signal,
   optical pump means for generating optical energy in excess of the power that is necessary to pump the doped optical fiber coupled to pump said rare earth doped optical fiber amplifier, oscillator means for generating a subcarrier signal, a source of telemetry signals, modulator means coupled to modulate the subcarrier signal from the oscillator means with the signals from the source of telemetry signals, and means for coupling the signal from the modulator means to the optical pump means to modulate the optical signal for pumping the rare earth doped optical fiber amplifier with the modulated subcarrier signal.

2. The telemetry system of claim 1 wherein said modulator means amplitude modulates said subcarrier signal with said telemetry signals.

3. The telemetry system of claim 1 wherein said modulator means frequency modulates said subcarrier signal with said telemetry signals.

4. The telemetry system of claim 1 wherein said modulator means phase-shift-key modulates said subcarrier signal with telemetry signals.

5. The telemetry system of claim 1 wherein said modulator means amplitude-shift-key modulates said subcarrier signal with said telemetry signals.

6. The telemetry system of claim 1 wherein said modulator means frequency-shift-key modulates said subcarrier signal with said telemetry signals.

7. The telemetry system of claim 1 comprising an optical fiber coupled to said optical fiber amplifier for carrying amplified optical data signals and telemetry signals, a wavelength selective coupler coupled to said optical fiber at a location remote from said optical fiber amplifier for separating the received modulated optical pump signal from the data signal amplified by said optical amplifier.

8. The telemetry system of claim 1 wherein the wavelength of the signal from the optical amplifier is substantially 1.55 $\mu$m and the wavelength of the signal from the pump is substantially 1.48 $\mu$m.

9. The telemetry system of claim 1 wherein the subcarrier modulated pump signal travels in the same direction as the data signal.

10. The telemetry system of claim 1 wherein the subcarrier modulated pump signal travels in a direction opposite to the direction of the data signal.

* * * * *